Figure 1:
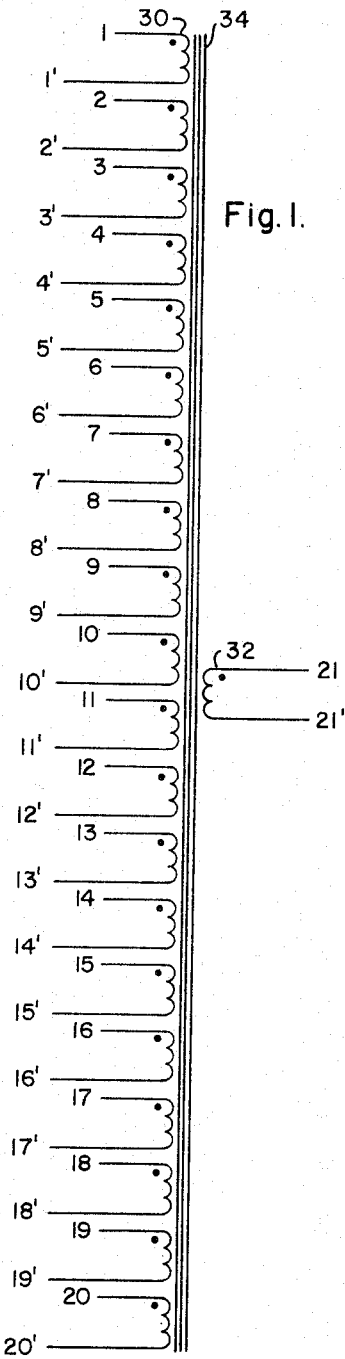

Sept. 27, 1966  A. D. ASHBY, JR., ETAL  3,275,966
ELECTRICAL TRANSFORMER HAVING A WOVEN WINDING
Filed Jan. 13, 1964  2 Sheets-Sheet 1

WITNESSES:
Bernard R. Gregory
James F. Young

INVENTORS
Artie D. Ashby, Jr. and
Edward R. Higgins.
BY
Donald R. Lackey
ATTORNEY

United States Patent Office 3,275,966
Patented Sept. 27, 1966

3,275,966
ELECTRICAL TRANSFORMER HAVING A WOVEN WINDING
Artie Dale Ashby, Jr., Arbutus, and Edward R. Higgins, North Linthicum, Md., assignors to Westinghouse Electric Corporation, Pittsburgh, Pa., a corporation of Pennsylvania
Filed Jan. 13, 1964, Ser. No. 337,331
5 Claims. (Cl. 336—181)

This invention relates in general to multiwinding transformers, and more particularly to multiwinding transformers, whose plurality of windings have uniform electrical characteristics.

In certain applications, such as computers, it is often necessary to utilize electrical transformers having a plurality of windings which have low noise characteristics and uniform mutual electrical characteristics between the various windings. For example, minimum deviation of wire-to-wire or winding-to-winding capacitance and low leakage inductive reactance is essential in the fabrication of electrically symmetrical input and output windings of a load sharing matrix transformer for use in a magnetic core memory system. In addition to the symmetrical requirements of the windings, the winding-to-winding capacitance must be as low as possible to permit the transformer to pass steep wave front or fast rise time pulses. The leakage inductance of the transformer also affects the ability of the transformer to pass fast rise time pulses, and this parameter should be minimized for this reason.

In an attempt to improve noise cancellation in a load sharing matrix transformer the wires which were to form the plurality of input and output windings of the transformer were twisted into a cable-like structure and then wound on a magnetic core. This was found to provide a transformer having improved noise cancellation, but the twisted wire technique proved to have certain disadvantages, both electrically and mechanically. One electrical disadvantage was an increase in leakage inductance of the transformer due to the fact that some of the wires in the twisted cable were further from the core than other wires in the cable. Other electrical disadvantages were a great deviation of wire-to-wire capacitance from the average capacitance, and an increase in the average wire-to-wire capacitance. The mechanical disadvantages were experienced in the construction of the transformer. The twisted wires, being substantially round and relatively inflexible, did not provide a good space factor when wound upon the core of the transformer, thus increasing the size and cost of the transformer. It is, therefore, desirable to produce a new and improved transformer having a plurality of windings whose average wire-to-wire capacitance and leakage inductance is as small as possible, and whose wire-to-wire capacitance has minimum deviation from the average capacitance. Further, it is desirable to produce a transformer having these electrical characteristics with windings which utilize conductors that are very flexible and have a good space factor, to allow the transformer to be smaller and facilitate assembly of the transformer.

Accordingly, it is an object of this invention to provide a new and improved multi-winding electrical transformer.

Another object of this invention is to provide a new and improved transformer having a plurality of windings that has improved noise cancellation characteristics.

Still another object of the invention is to provide a new and improved transformer having a plurality of electrically symmetrical input and output windings.

Another object of this invention is to provide a new and improved transformer having a minimum leakage inductance.

A further object of this invention is to provide a new and improved transformer having a plurality of windings whose winding-to-winding capacitance does not substantially deviate from the average value of capacitance.

Another object of this invention is to provide a new and improved transformer having a plurality of windings whose winding-to-winding capacitance is a minimum.

A further object of this invention is to provide a new and improved winding for a transformer which is flexible and has an improved space factor which facilitates transformer construction and allows transformer size to be decreased.

Briefly, the present invention accomplishes the above cited objects by providing a transformer which has a plurality of insulated conductors, each of which form individual windings. The plurality of conductors are woven or braided to form a flat, flexible assembly. The assembly or cable formed by interweaving the conductors is then disposed in inductive relation with a magnetic core to form a plurality of windings having uniform electrical characteristics, low leakage inductance, and low winding-to-winding capacitance. Further, since the cable is flat, it is very flexible, wasting substantially no space when wound on the transformer core. The overall transformer size may be reduced, as the cable may be wound on a small radius tightly against the magnetic core.

Further objects and advantages of the invention will become apparent as the following description proceeds and features of novelty which characterize the invention will be pointed out in particularity in the claims annexed to and forming a part of the specification.

Figure 3:
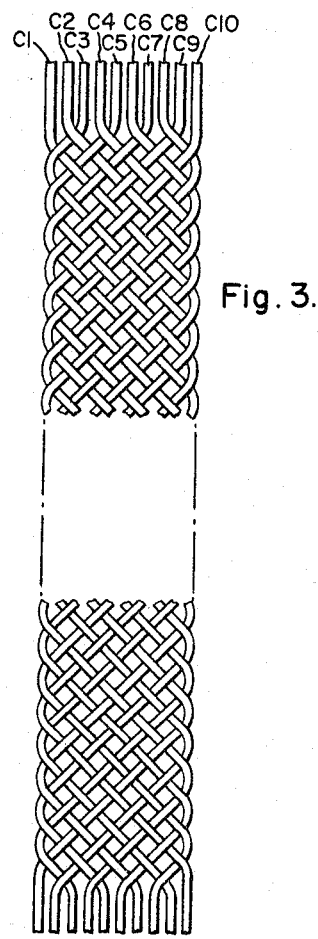
Figure 2:
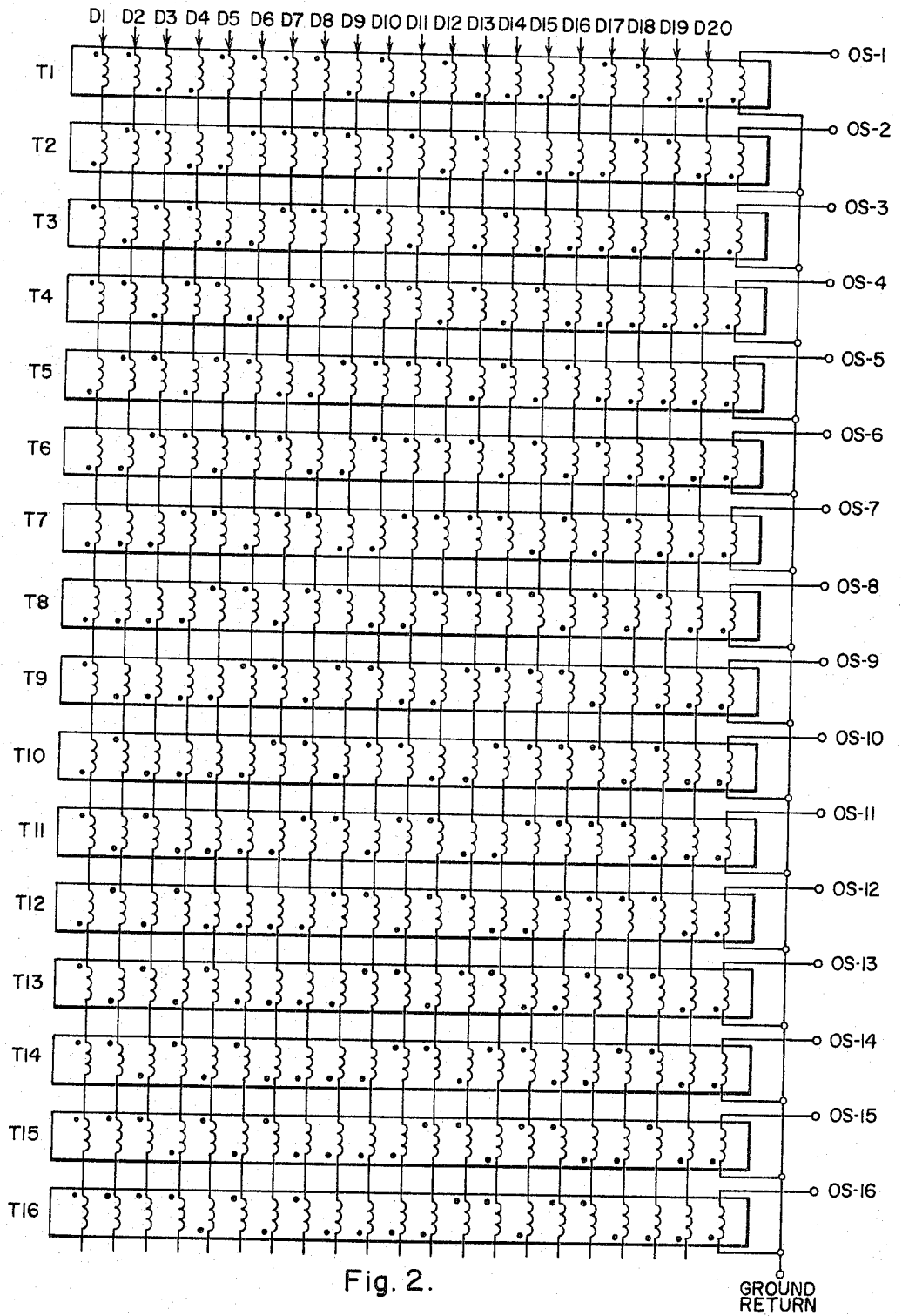

For a better understanding of the invention, reference may be had to the accompanying drawings in which:

FIG. 1 is a schematic diagram illustrating a multiwinding transformer which may be constructed according to the teachings of this invention, FIG. 2 is a schematic diagram illustrating a plurality of transformers of the type shown in FIG. 1, connected to form a load sharing matrix, and FIG. 3 shows how the conductors for forming the input and output windings of the transformer shown in FIGS. 1 and 2 may be interwoven into a coherent structure prior to disposing the conductors upon the magnetic core of the transformer.

Some types of memory systems require high current positive and negative pulses for the operation of the Read-Write circuit. During the time the current pulses are absent, it is essential that the drive lines be noise free. Multi-winding transformers connected in a load sharing matrix configuration, operating with a plurality of small unipolar current drive devices, possess many advantages over trying to develop the high current bipolar pulses directly by transistorized circuits. FIG. 1 is a schematic diagram illustrating a transformer having twenty input windings 30 and an output winding 32, having terminals 1 through 21 and 1' through 21', as illustrated. The windings 30 and 32 are disposed in inductive relation with magnetic core 34.

FIG. 2 is a schematic diagram illustrating a plurality of transformers of the type as shown in FIG. 1, connected to form a load sharing matrix. Basically, the load sharing matrix is a logic system capable of delivering high current bi-polar pulses by utilizing several low current unipolar drivers. It consists of current drivers and transformers which are connected in a predetermined pattern such that for a given combination of drivers selected, a particular transformer will have an output and all the other transformers will have zero outputs. The power output of the selected transformer is the sum of the input power supplied by each of the selected drivers. An example of a load sharing matrix is illustrated in FIG. 2, with sixteen load sharing transformers, T1 through T16, connected with twenty drivers D1 through D20. The current from the drivers D1 through D20 flows through the transformers T1 through T16 as indicated by the direction of the arrows, with the current flowing through the windings relative to the transformer cores to produce the polarities indicated. The output signal appears at the appropriate output terminal, OS–1 through OS–16, depending upon which transformer has been selected.

The important characteristic of the matrix shown in FIG. 2 is that in any transformer, the number of positive windings (10) equals the number of negative windings (10). The positive and negative windings are then arranged such that when 10 drivers are selected to produce a positive or negative pulse out of the selected transformer, the outputs of all the other transformers will be zero. For example, if it is desired to produce a positive pulse from transformer T9, drivers D1, D6, D7, D9, D10, D13, D14, D15, D16, and D18 will be energized, as these drivers all energize positive windings on transformers T9. It will then be noted that this combination of drivers will energize 5 positive and 5 negative windings in all of the other transformers, thus producing zero outputs from all transformers except the selected transformer D9. If a negative pulse is desired from transformer T9, drivers D2, D3, D4, D5, D8, D11, D12, D17, D19 and D20 will be energized, as these drivers all energize the negative windings of transformers T9. Again, it will be noted that these drivers will energize 5 positive and 5 negative windings in all of the remaining transformers, so that only transformer T9 will produce an output.

It is readily apparent that this arrangement has many advantages, among which are the fact that the drivers are all unipolar, thus reducing the number of components in each driver. Also, the amount of current required to be delivered by each driver is small, making it possible to use relatively low power molecularized circuits to achieve a high current output. Another advantage is the fact that the output is transformer coupled, thus allowing the output to drive wide range loads, as any one of a wide range of output voltages may be selected by merely utilizing the transformer ratio required to obtain the selected voltage. Also, the failure of one driver will not adversely affect the operation of the circuit, as the output current is decreased only 10% by the failure of one driver and the amount of noise introduced into the otherwise noise-free unselected outputs is within the tolerable range.

In order for the load sharing matrix described above to function properly, however, the transformers used in the matrix must meet certain requirements. First, the matrix must be fast acting and must pass fast rise time pulses. Further, the drive lines must be noise free in order to prevent erratic operation. Another essential requirement is that the windings must be electrically symmetrical.

Some of the factors influencing the speed of the matrix are the leakage inductance of the transformer and the winding-to-winding capacitance of the transformer windings. Noise is produced by non-symmetrical electrical characteristics of the windings, such as excessive deviation in winding-to-winding capacitance. The use of a plurality of parallel wires each individually wound on the transformer core is unacceptable, producing a circuit with excessive noise as well as a circuit with a slow response characteristic. Twisting the plurality of insulated wires into a cable and winding the cable on the transformer core produces a circuit which has improved noise characteristics, but it increases the leakage inductance of the transformer due to the fact that some of the wires are further from the magnetic core than others and the fact that the twisted cable is not flexible enough to allow it to be wound tightly around the magnetic core. Thus, a twisted cable increases the size and cost of the transformer, and produces undesirable electrical characteristics as well.

A solution to the above problems was found in interweaving all of the insulating wires which form the transformer input windings to form a flat woven or braided cable assembly, such as illustrated in FIG. 3. The output winding may also be included in the woven assembly, if desired, as it is also important that uniform electrical characteristics exist between each input winding and the output winding. The assembly of interwoven conductors shown in FIG. 3 is illustrated as having 10 individual conductors, C1 through C10, although any number of conductors may be used depending upon the particular application. It will be noted that each conductor has substantially the same mechanical configuration, with each wire being slightly offset from the adjacent wires, and the wires interleaved to form a coherent woven assembly. The wires are electrically insulated from each other, such as by an enamel or epoxy coating on the conductors. A woven cable of insulated wires is very flexible and is easily wound with a small radius, thus facilitating construction of the transformer, as well as having an excellent space factor. The flat woven cable assembly may be wound upon the transformer core with substantially no wasted space, and all of the wires of each turn are the same distance from the core. In other words, the wires of each turn are all in substantially the same plane. The tightness and closeness to the core of the windings, in addition to reducing the transformer size and cost, reduces leakage inductance to a minimum and thus allows fast rise time pulses to be passed by the matrix.

The woven or braided cable also forms a plurality of windings whose uniformity or electrical symmetry is remarkable. As can be seen from examining FIG. 3, this is due to the fact that each conducting strand or wire continuously occupies a different location in the cable, with the net electrical effect produced by each strand, as influenced by strand position, being the same as the net effect of each of the other strands. Further, the symmetrical electrical effects of the windings produce substantially noise free lines, thus insuring stable operation of the matrix circuit.

The woven cable shown in FIG. 3 when disposed in inductive relation with a magnetic core also produces very desirable capacitive characteristics, both in the uniformity of winding-to-winding capacitance, as well as reducing the winding-to-winding capacitance to a minimum value. To illustrate the remarkable improvements in electrical uniformity and reduction in winding-to-winding capacitance, two load sharing matrix transformers were constructed, with the only difference in the transformers being in the fact that the windings of one of the transformers were constructed from eight twisted insulated wires and an output winding, and the windings of the other transformer were formed by using eight woven wires similar to the configuration shown in FIG. 3, and an output winding. The interwinding capacitance was then measured for both transformers using a frequency of one kilocycle. The recorded data from these measurements is shown in Table I, with windings one through eight being input windings and winding nine being the output winding.

TABLE I.—INTERWINDING CAPACITANCE IN MICRO-MICROFARADS MEASURED AT 1 KILOCYCLE

| Windings | Transformer Using Woven Conductors | Transformer Using Twisted Conductors |
|---|---|---|
| 1-2 | 23 | 29 |
| 1-3 | 22 | 28 |
| 1-4 | 20 | 29 |
| 1-5 | 20 | 35 |
| 1-6 | 20 | 28 |
| 1-7 | 20 | 29 |
| 1-8 | 20 | 31 |
| 2-3 | 22 | 28 |
| 2-4 | 22 | 32 |
| 2-5 | 21 | 34 |
| 2-6 | 21 | 31 |
| 2-7 | 21 | 32 |
| 2-8 | 21 | 26 |
| 3-4 | 21 | 31 |
| 3-5 | 23 | 36 |
| 3-6 | 21 | 32 |
| 3-7 | 21 | 28 |
| 3-8 | 21 | 32 |
| 4-5 | 21 | 24 |
| 4-6 | 21 | 30 |
| 4-7 | 22 | 31 |
| 4-8 | 21 | 29 |
| 5-6 | 23 | 36 |
| 5-7 | 22 | 34 |
| 5-8 | 22 | 37 |
| 6-7 | 22 | 29 |
| 6-8 | 23 | 29 |
| 7-8 | 23 | 28 |
| 9-1 | 19 | 21 |
| 9-2 | 19 | 20 |
| 9-3 | 19 | 20 |
| 9-4 | 19 | 20 |
| 9-5 | 20 | 25 |
| 9-6 | 20 | 20 |
| 9-7 | 19 | 20 |
| 9-8 | 20 | 20 |

From Table I it can be seen that the average capacitance between any two input windings or between any input winding and the output winding on the transformer using twisted cable was 28.72 $\mu\mu f.$, while the average capacitance between any two input windings or between any input winding and the output winding on the transformer using woven cable was only 20.97 $\mu\mu f.$ This substantial reduction in interwinding capacitance greatly increases the speed of the matrix circuit. Further, the average deviation from the average value of interwinding capacitance was 3.9 $\mu\mu f.$ for the transformer using twisted conductors and only .99 $\mu\mu f.$ for the transformer using the woven conductors, thus illustrating the electric symmetry of the windings, which is essential in producing noise free operation of the matrix circuit.

The woven or braided pattern shown in FIG. 3 is illustrative only, as changes in the woven pattern may be made without substantially affecting the operation of the matrix circuit. The important thing is the interweaving of the windings into a flat cable such that the net electrical effect, as influenced by location of each strand in the cable, is the same for all strands.

Transformers, such as transformers utilized in a load sharing matrix, constructed according to the teachings of this invention have many advantages. The flat woven cable facilitates transformer construction, as the space factor is excellent. The cable or assembly is flexible, allowing all turns of the plurality of windings to be tightly wound around the transformer core, making the transformer smaller and less expensive. The tight construction with substantially no wasted space also reduces the leakage inductance of the transformer to a minimum, allowing fast rise time pulses to be passed by the matrix circuit. Further, the windings are electrically symmetrical, reducing noise to an absolute minimum and reducing deviation of electrical characteristics, such as capacitance. The woven construction of the input windings also reduces interwinding capacitance to a minimum, further aiding the transformer in passing fast rise time pulses.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense. For example, the interweaving of the plurality of wires which form the plurality of windings on a transformer may be utilized on other special purpose transformers and in other applications than the matrix network described. Further, the particular matrix design shown in FIG. 2 is illustrative only, with more or less transformers and drivers being utilized depending upon the number of outputs desired.

We claim as our invention:

1. An electrical transformer comprising a plurality of input windings and at least one output winding all having terminals adapted for connection to external electrical circuits, magnetic core means, at least said plurality of input windings being formed of a plurality of insulated conductors, said insulated conductors being interleaved, forming a substantially flat assembly of woven conductors disposed in substantially the same plane, said assembly of conductors being disposed in inductive relation with said magnetic core means, forming a plurality of individual windings having similar electrical characteristics.

2. An electrical transformer comprising a magnetic core, a plurality of input and output windings each formed of a conductor having electrical insulation disposed thereon, said winding conductors being interwoven in substantially a common plane, forming a substantially flat assembly, said assembly of winding conductors being disposed in inductive relation with said magnetic core, providing a plurality of individual windings having similar electrical characteristics.

3. An electrical transformer comprising a magnetic core, a plurality of input windings and at least one output winding, each of said input windings being formed of an electrically insulated conductor, said winding conductors being braided to form a substantially flat assembly in which the conductors are all substantially in the same plane, said assembly of conductors being disposed in inductive relation with said magnetic core, the braiding of said conductors forming each conductor to substantially the same mechanical configuration within the assembly as all the other conductors, providing a plurality of input windings having similar electrical characteristics.

4. An electrical transformer comprising, a plurality of input windings, an output winding, a magnetic core, said plurality of input windings and said output winding being disposed in inductive relation with said magnetic core, at least the plurality of input windings being formed of a plurality of insulated conductors, interwoven into a flat configuration in which all of the insulated conductors are in substantially the same plane and all have substantially the same mechanical configuration, providing a plurality of windings having similar electrical characteristics.

5. An electrical transformer comprising a magnetic core; a plurality of electrically insulated conductors; said plurality of conductors being interwoven, with each conductor having substantially the same mechanical configuration and slightly offset from adjacent conductors in substantially the same plane; the interweaving of said conductors forming a substantially flat, coherent assembly; said assembly of interwoven conductors being disposed in inductive relation with said magnetic core to form a plurality of input windings having similar electrical characteristics; and, at least one output winding disposed in inductive relation with said magnetic core.

References Cited by the Examiner

UNITED STATES PATENTS

| 221,170 | 11/1879 | Holmes et al. | 174—34 |
| 782,463 | 2/1905 | Parsons | 174—34 |

FOREIGN PATENTS 507,235 11/1954 Canada.

LEWIS H. MYERS, *Primary Examiner.*
ROBERT K. SCHAEFER, *Examiner.*
D. J. BADER, *Assistant Examiner.*